US011247692B2

(12) United States Patent
Ohara et al.

(10) Patent No.: US 11,247,692 B2
(45) Date of Patent: Feb. 15, 2022

(54) PREDICTION DEVICE, PREDICTION METHOD, AND STORAGE MEDIUM

(71) Applicant: HONDA MOTOR CO., LTD., Tokyo (JP)

(72) Inventors: Kazuma Ohara, Wako (JP); Yosuke Sakamoto, Wako (JP); Yuki Motegi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 225 days.

(21) Appl. No.: 16/243,176

(22) Filed: Jan. 9, 2019

(65) Prior Publication Data

US 2019/0225231 A1 Jul. 25, 2019

(30) Foreign Application Priority Data

Jan. 19, 2018 (JP) .............................. JP2018-007693

(51) Int. Cl.
*B60W 50/00* (2006.01)
*G05B 13/04* (2006.01)
(Continued)

(52) U.S. Cl.
CPC ........ *B60W 50/0097* (2013.01); *B60W 30/18* (2013.01); *G05B 13/048* (2013.01);
(Continued)

(58) Field of Classification Search
CPC ............. B60W 50/0097; B60W 30/18; B60W 2554/4041; B60W 2555/60; G05B 13/048;
(Continued)

(56) References Cited

U.S. PATENT DOCUMENTS 8,428,843 B2 * 4/2013 Lee ..................... B62D 15/025
701/93
8,612,150 B2 * 12/2013 Heger .................... G08G 1/166
701/532
(Continued)

FOREIGN PATENT DOCUMENTS

CN 102044170 5/2011
CN 102460535 5/2012
(Continued)

OTHER PUBLICATIONS

Japanese Notice of Allowance for Japanese Patent Application No. 2018-007693 dated Sep. 10, 2019.
(Continued)

*Primary Examiner* — Geepy Pe
*Assistant Examiner* — Daniel Tyler Reich
(74) *Attorney, Agent, or Firm* — Amin, Turocy & Watson, LLP

(57) ABSTRACT

A prediction device including: a recognizer recognizing a road structure and another vehicle in the vicinity of a subject vehicle; and a predictor predicting a running locus of the other vehicle recognized by the recognizer in the future on the basis of the road structure recognized by the recognizer in a predetermined situation, wherein, in the predetermined situation, in a case in which at least a part of the road structure used for predicting the running locus of the other vehicle in the future is not recognizable for the recognizer, the predictor predicts the running locus of the other vehicle in the future on the basis of a running locus of the other vehicle in the past acquired on the basis of a result of recognition in the past that is acquired by the recognizer.

6 Claims, 14 Drawing Sheets

(51) Int. Cl.
    *B60W 30/18*     (2012.01)
    *G06K 9/00*     (2006.01)
    *G06K 9/62*     (2006.01)

(52) U.S. Cl.
    CPC ..... *G06K 9/00798* (2013.01); *G06K 9/00805* (2013.01); *G06K 9/6289* (2013.01); *B60W 2554/4041* (2020.02); *B60W 2555/60* (2020.02)

(58) Field of Classification Search
    CPC ........... G06K 9/00798; G06K 9/00805; G06K 9/6289
    See application file for complete search history.

(56) References Cited

U.S. PATENT DOCUMENTS

| | | | | |
|---|---|---|---|---|
| 8,818,680 | B2* | 8/2014 | Isaji | B60W 30/18145 |
| | | | | 701/96 |
| 8,996,276 | B2* | 3/2015 | Takazawa | G08G 1/161 |
| | | | | 701/98 |
| 9,008,940 | B2* | 4/2015 | Ueyama | B60W 30/095 |
| | | | | 701/96 |
| 2010/0030474 | A1* | 2/2010 | Sawada | B62D 15/0265 |
| | | | | 701/301 |
| 2017/0241794 | A1* | 8/2017 | Koo | G01C 21/3617 |

FOREIGN PATENT DOCUMENTS

| | | |
|---|---|---|
| CN | 107000745 | 8/2017 |
| CN | 107077791 | 8/2017 |
| JP | 2005-165555 | 6/2005 |
| JP | 2009-157499 | 7/2009 |
| JP | 2010-083314 | 4/2010 |
| JP | 2011-209919 | 10/2011 |
| WO | 2012/014280 | 2/2012 |

OTHER PUBLICATIONS

Chinese Office Action for Chinese Patent Application No. 201910006037.8 dated Apr. 9, 2021.

* cited by examiner

PREDICTION DEVICE, PREDICTION METHOD, AND STORAGE MEDIUM

CROSS-REFERENCE TO RELATED APPLICATION

Priority is claimed on Japanese Patent Application No. 2018-007693, filed Jan. 19, 2018, the content of which is incorporated herein by reference.

BACKGROUND

Field of the Invention

The present invention relates to a prediction device, a prediction method, and a storage medium.

Description of Related Art

Conventionally, predicting an approach between a subject vehicle and another vehicle by predicting a traveling locus of the other vehicle for various uses has been researched. For example, in Japanese Unexamined Patent Application First Publication No. 2011-209919, a technology has been disclosed in which a predicted traveling route of a subject vehicle is specified on the basis of the current position of the subject vehicle and map data, positions of map-generated intersection points on the predicted traveling route are set, a direction of the vehicle at each point is predicted on the basis of a predicted locus passing through each point, an attention area in which attention is required at the time of traveling is specified, a range of directions in which the attention area is present as seen from a vehicle located at a map-generated intersection point in the predicted direction is calculated, and an intersection map representing a correspondence relationship between a direction as seen from the vehicle and a degree of risk is generated on the basis of the calculated range of directions.

SUMMARY

In this conventional technology, it is necessary to be able to recognize a road structure (road shape) as a premise of the prediction, and accordingly, applicable situations are limited. In order to recognize a road structure, structures partitioning a road, for example, a curbstone, a road partition line, and the like need to be recognized using a camera, a laser radar, or the like, for example, but in a situation in which an oncoming vehicle turns right or left and traverses in front of the subject vehicle at an intersection, structures may enter a blind area due to the oncoming vehicle and may not be able to be recognized. For this reason, in the conventional technology, there are cases in which a traveling locus of another vehicle in the future may not be able to be continuously predicted.

An aspect of the present invention is in consideration of such situations, and one object thereof is to provide a prediction device, a prediction method, and a storage medium capable of continuously predicting running loci of other vehicles in the future.

A prediction device, a prediction method, and a storage medium according to the present invention employ the following configurations.

(1): According to one aspect of the present invention, there is provided a prediction device including: a recognizer recognizing a road structure and another vehicle in the vicinity of a subject vehicle; and a predictor predicting a running locus of the other vehicle recognized by the recognizer in the future on the basis of the road structure recognized by the recognizer in a predetermined situation, wherein, in the predetermined situation, in a case in which at least a part of the road structure used for predicting the running locus of the other vehicle in the future is not recognizable for the recognizer, the predictor predicts the running locus of the other vehicle in the future on the basis of a running locus of the other vehicle in the past acquired on the basis of a result of recognition in the past that has been acquired by the recognizer.

(2): In the aspect (1) described above, the predetermined situation is a situation in which the other vehicle changes a course at an intersection.

(3): In the aspect (2) described above, the predictor predicts the running locus of the other vehicle in the future on the basis of positions of an entrance and an exit of the intersection through which the other vehicle passes, which are acquired from the road structure recognized by the recognizer, and predicts the running locus of the other vehicle in the future on the basis of the running locus of the other vehicle in the past in a case in which one or both of the positions of the entrance and the exit are not clear.

(4): In the aspect (3) described above, the predictor predicts the running locus of the other vehicle in the future by correcting a provisional running locus predicted from the running locus of the other vehicle in the past on the basis of the position of the exit in a case in which the position of the exit is recognized by the recognizer, and the position of the entrance is not recognizable for the recognizer.

(5): In the aspect (3) described above, in a case in which the position of the exit is not recognizable for the recognizer, the predictor estimates the position of the exit on the basis of a running locus of a preceding vehicle in the past running in front of the other vehicle that is a target for predicting the running locus in the future and predicts the running locus of the other vehicle in the future.

(6): In the aspect (3) described above, in a case in which the position of the exit is not recognizable for the recognizer, the predictor estimates the position of the exit on the basis of the road structure on a side facing the exit at the intersection and predicts the running locus of the other vehicle in the future on the basis of the estimated position of the exit.

(7): In the aspect (3) described above, in a case in which the position of the exit is not recognizable for the recognizer, the predictor estimates the position of the exit on the basis of a road width on a side facing the exit at the intersection and predicts the running locus of the other vehicle in the future on the basis of the estimated position of the exit.

(8): In the aspect (3) described above, in a case in which the position of the exit is not recognizable for the recognizer, the predictor estimates the position of the exit on the basis of a position of a structure part disposed near the exit and predicts the running locus of the other vehicle in the future on the basis of the estimated position of the exit.

(9): In the aspect (1) described above, the predetermined situation is a situation in which the other vehicle crosses a road and advances out of the road in a case in which the other vehicle is an oncoming vehicle.

(10): A prediction method according to another aspect of the present invention is a prediction method using a computer including: recognizing a road structure and another vehicle in the vicinity of a subject vehicle; predicting a running locus of the other vehicle in the future on the basis of the recognized road structure in a predetermined situation; and predicting the running locus of the other vehicle in the future on the basis of a running locus of the other vehicle in the past acquired on the basis of a result of recognition in the past in a case in which at least a part of the road structure used for predicting the running locus of the other vehicle in the future is not recognizable in the predetermined situation.

(11): A storage medium according to another aspect of the present invention is a computer-readable non-transitory storage medium storing a program thereon, the program causing a computer to execute: recognizing a road structure and another vehicle in the vicinity of a subject vehicle; predicting a running locus of the other vehicle in the future on the basis of the recognized road structure in a predetermined situation; and predicting the running locus of the other vehicle in the future on the basis of a running locus of the other vehicle in the past acquired on the basis of a result of recognition in the past in a case in which at least a part of the road structure used for predicting the running locus of the other vehicle in the future is not recognizable in the predetermined situation.

According to (1) to (11), running loci of other vehicles in the future can be predicted continuously.

DESCRIPTION OF EMBODIMENTS

Hereinafter, a prediction device, a prediction method, and a storage medium according to embodiments of the present invention will be described with reference to the drawings.

A prediction device is used for various purposes. In the following description, although the prediction device will be described as being applied to an automatic driving vehicle, the prediction device can be applied also to an alarm device that outputs an alarm in accordance with an approach of another vehicle, a driving supporting device that performs inter-vehicle distance control, lane keep supporting control, and the like and performs switching of control or adjusting the amount of control in accordance with a locus of another vehicle in the future, and the like.

[Configuration]

Figure 1:
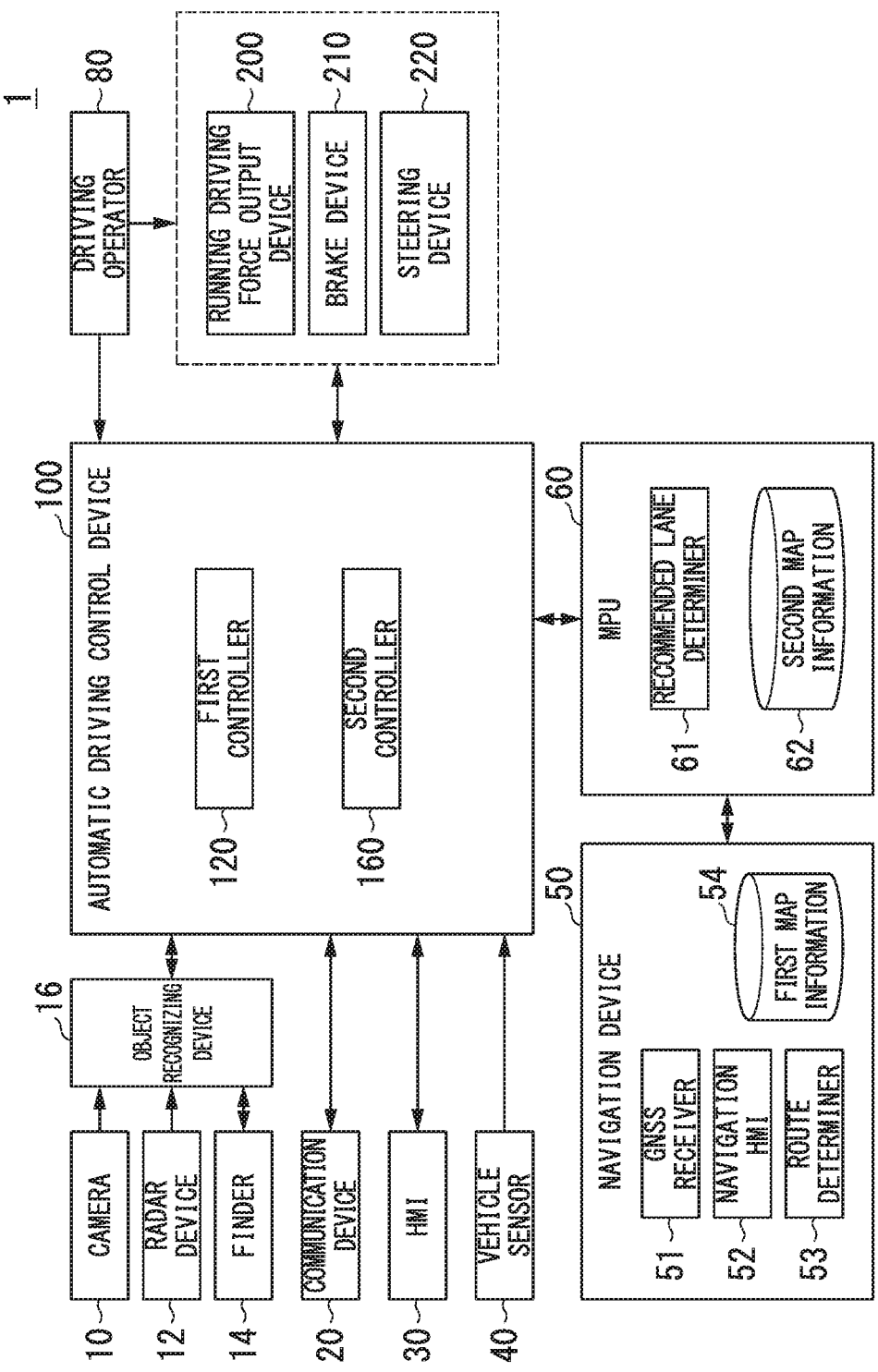
FIG. 1 is a configuration diagram of a vehicle system using a prediction device.

FIG. 1 is a configuration diagram of a vehicle system 1 using a prediction device. A vehicle in which the vehicle system 1 is mounted is, for example, a vehicle having two wheels, three wheels, four wheels, or the like, and a driving source thereof is an internal combustion engine such as a diesel engine or a gasoline engine, an electric motor, or a combination thereof. In a case in which an electric motor is included, the electric motor operates using electric power generated using a power generator connected to an internal combustion engine or discharge power of a secondary cell or a fuel cell.

The vehicle system 1, for example, includes a camera 10, a radar device 12, a finder 14, an object recognizing device 16, a communication device 20, a human machine interface (HMI) 30, a vehicle sensor 40, a navigation device 50, a map positioning unit (MPU) 60, a driving operator 80, an automatic driving control device 100, a running driving force output device 200, a brake device 210, and a steering device 220. Such devices and units are interconnected using a multiplex communication line such as a controller area network (CAN) communication line, a serial communication line, a radio communication network, or the like. The configuration illustrated in FIG. 1 is merely one example, and thus, a part of the configuration may be omitted, and, furthermore, other components may be added thereto.

The camera 10, for example, is a digital camera using a solid-state imaging device such as a charge coupled device (CCD) or a complementary metal oxide semiconductor (CMOS). One or a plurality of cameras 10 are installed at arbitrary places on a vehicle (hereinafter, referred to as a subject vehicle M) in which the vehicle system 1 is mounted. In a case in which the side in front is to be imaged, the camera 10 is installed at an upper part of a front windshield, a rear face of a rear-view mirror, or the like. The camera 10, for example, repeatedly images the vicinity of the subject vehicle M periodically. The camera 10 may be a stereo camera.

The radar device 12 emits radiowaves such as millimeter waves to the vicinity of the subject vehicle M and detects at least a position of (a distance and an azimuth to) an object by detecting radiowaves (reflected waves) reflected by the object. One or a plurality of radar devices 12 are installed at arbitrary places on the subject vehicle M. The radar device 12 may detect a position and a speed of an object using a frequency modulated continuous wave (FM-CW) system.

The finder 14 is a light detection and ranging (LIDAR) device. The finder 14 emits light to the vicinity of the subject vehicle M and measures scattering light. The finder 14 detects a distance to a target on the basis of a time from light emission to light reception. The emitted light, for example, is a pulse-form laser light. One or a plurality of finders 14 are mounted at arbitrary positions on the subject vehicle M. The finder 14 is one example of an object detecting device.

The object recognizing device 16 may perform a sensor fusion process on results of detection using some or all of the camera 10, the radar device 12, and the finder 14, thereby allowing recognition of a position, a type, a speed, and the like of an object. The object recognizing device 16 outputs a result of recognition to the automatic driving control device 100. The object recognizing device 16, as is necessary, may output results of detection using the camera 10, the radar device 12, and the finder 14 to the automatic driving control device 100 as they are.

The communication device 20, for example, communicates with other vehicles present in the vicinity of the subject vehicle M using a cellular network, a Wi-Fi network, BLUETOOTH®, dedicated short range communication (DSRC), or the like or communicates with various server apparatuses through a radio base station.

The HMI 30 presents various types of information to an occupant of the subject vehicle M and receives an input operation performed by a vehicle occupant. The HMI 30 may include various display devices, a speaker, a buzzer, a touch panel, switches, keys, and the like.

The vehicle sensor 40 includes a vehicle speed sensor that detects a speed of the subject vehicle M, an acceleration sensor that detects an acceleration, a yaw rate sensor that detects an angular velocity around a vertical axis, an azimuth sensor that detects the azimuth of the subject vehicle M, and the like.

The navigation device 50, for example, includes a global navigation satellite system (GNSS) receiver 51, a navigation HMI 52, and a route determiner 53 and stores first map information 54 in a storage device such as a hard disk drive (HDD) or a flash memory. The GNSS receiver 51 identifies a position of a subject vehicle M on the basis of signals received from GNSS satellites. The position of the subject vehicle M may be identified or complemented by an inertial navigation system (INS) using an output of the vehicle sensor 40. The navigation HMI 52 includes a display device, a speaker, a touch panel, a key, and the like. A part or the whole of the navigation HMI 52 and the HMI 30 described above may be configured to be shared. The route determiner 53, for example, determines a route to a destination input by a vehicle occupant using the navigation HMI 52 (hereinafter, referred to as a route on a map) from a position of the subject vehicle M identified by the GNSS receiver 51 (or an input arbitrary position) by referring to the first map information 54. The first map information 54, for example, is information in which a road form is represented by respective links representing a road and respective nodes connected using the links. The route on the map determined by the route determiner 53 is output to the MPU 60. The navigation device 50 may perform route guidance using the navigation HMI 52 on the basis of the route on the map determined by the route determiner 53. The navigation device 50, for example, may be realized by a function of a terminal device such as a smartphone or a tablet terminal held by a vehicle occupant. The navigation device 50 may transmit a current location and a destination to a navigation server through the communication device 20 and acquire a route on the map received from the navigation server as a reply.

The MPU 60, for example, functions as a recommended lane determiner 61 and stores second map information 62 in a storage device such as an HDD or a flash memory. The recommended lane determiner 61 divides a route provided from the navigation device 50 into a plurality of blocks (for example, divides the route into blocks of 100 [m] in the advancement direction of the vehicle) and determines a recommended lane for each block by referring to the second map information 62. In a case in which a branching place, a merging place, or the like is present in the route, the recommended lane determiner 61 determines a recommended lane such that the subject vehicle M can run on a reasonable route for advancement to divergent destinations.

The second map information 62 is map information having an accuracy higher than that of the first map information 54. The second map information 62, for example, includes information of the center of each lane, information of a boundary between lanes, or the like. Road information, traffic regulation information, address information (an address and a postal code), facility information, telephone number information, and the like may be included in the second map information 62. The second map information 62 may be updated as is necessary by accessing another device using the communication device 20.

The driving operator 80, for example, includes an acceleration pedal, a brake pedal, a shift lever, a steering wheel, a steering wheel variant, a joystick, and other operators. A sensor detecting the amount of an operation or the presence/absence of an operation is installed in the driving operator 80, and a result of the detection is output to the automatic driving control device 100 or at least one or all of the running driving force output device 200, the brake device 210, and the steering device 220.

The automatic driving control device 100, for example, includes a first controller 120 and a second controller 160. Each of the first controller 120 and second controller 160, for example, is realized by a hardware processor such as a central processing unit (CPU) executing a program (software). Some or all of such constituent elements may be realized by hardware (a circuit unit; including circuitry) such as a large scale integration (LSI), an application specific integrated circuit (ASIC), a field-programmable gate array (FPGA), or a graphics processing unit (GPU) or may be realized by cooperation between software and hardware. The program may be stored in a storage device (a storage device including a non-transitory storage medium) such as a hard disk drive (HDD) or a flash memory in advance or may be stored in a storage medium (non-transitory storage medium) such as a DVD or a CD-ROM that can be loaded or unloaded and installed by loading the storage medium into a drive device. The automatic driving control device 100 is one example of a vehicle control device.

Figure 2:
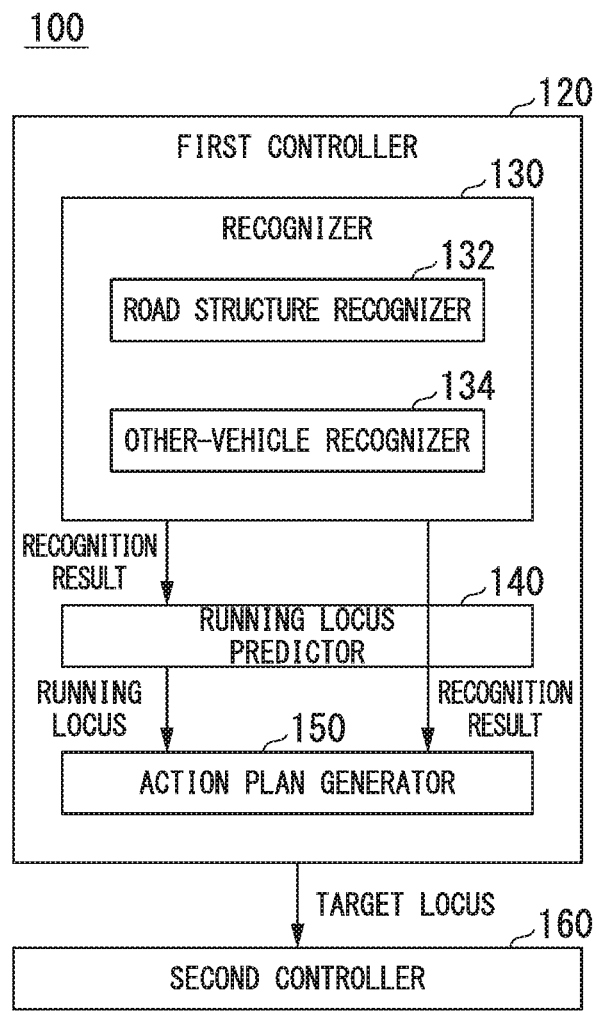
FIG. 2 is a functional configuration diagram of a first controller and a second controller.

FIG. 2 is a functional configuration diagram of the first controller 120 and the second controller 160. The first controller 120, for example, includes a recognizer 130, a running locus predictor 140, and an action plan generator 150.

The recognizer 130 recognizes a surrounding status of the subject vehicle M on the basis of information input from the camera 10, the radar device 12, and the finder 14 through the object recognizing device 16. The recognizer 130, for example, includes a road structure recognizer 132 and an other-vehicle recognizer 134. Various objects are included in a surrounding status recognized by the recognizer. The position of an object, for example, is recognized, first, as a position on an absolute coordinate system having a representative point (the sensor position or the center of gravity, the center of a driving shaft, or the like) of the subject vehicle M as its origin, is converted into a position on road coordinates along the road as is necessary, and is used for control.

The road structure recognizer 132 recognizes a road structure in the vicinity of the subject vehicle. For example, the road structure recognizer 132 recognizes a road partition line, a curbstone, a median strip, a guardrail, and the like and recognizes a shape of a road (road structure) partitioned thereby. In the recognized road structure, various kinds of information such as a width of each lane, a position of a connection part connected with an intersection. Details thereof will be described later.

The other-vehicle recognizer 134 recognizes states of other vehicles such as positions, speeds, and accelerations that are present in the vicinity of the subject vehicle M. The positions of other vehicles may be represented using representative points such as the centers of gravity or corners of the other vehicles or may be represented using areas having a spread.

The surrounding status recognized by the recognizer 130 may include a relative position and posture between the subject vehicle M and the running lane, states of bicycles and pedestrians, road events such as a temporary stop line, an obstacle, a red traffic signal, and a tollgate and other information in addition to the road structure and other vehicles. A result of the recognition acquired by the recognizer 130 is output to the running locus predictor 140 and the action plan generator 150.

The running locus predictor 140, in a predetermined situation, predicts running loci of the other vehicles, which have been recognized by the other-vehicle recognizer 134, in the future on the basis of the road structure recognized by the road structure recognizer 132. In a predetermined scene, in a case in which at least a part of the road structure used for predicting the running loci of the other vehicles in the future cannot be recognized by the road structure recognizer 132 in a predetermined situation, the running locus predictor 140 predicts the running loci of the other vehicles in the future on the basis of running loci of vehicles in the past acquired on the basis of results of recognition acquired by the other-vehicle recognizer 134 in the past. Details thereof will be described later.

The action plan generator 150 generates a target locus along which the subject vehicle M runs in the future such that it basically runs in a recommended lane determined by the recommended lane determiner 61 and does not interfere with the running loci of the other vehicles in the future predicted by the running locus predictor 140. The target locus, for example, includes a plurality of locus points and speed elements. For example, the target locus is represented by sequentially aligning places (locus points) at which the subject vehicle M is to arrive. A locus point is a position at which the subject vehicle M is to arrive for every predetermined running distance (for example about several [m]) in terms of a distance along the road, and, separately from that, a target speed and a target acceleration for every predetermined sampling time (for example, a fraction of a second) are generated as a part of the target locus. A locus point may be a position at which the subject vehicle M is to arrive at a sampling time among predetermined sampling time. In such a case, information of the target speed and the target acceleration is represented at the interval of locus points.

A combination of the recognizer 130 and the running locus predictor 140 forms one example of a "prediction device". A part of the function of the recognizer 130 described above may be included in the object recognizing device 16. In such a case, the "prediction device" may include the object recognizing device 16. The "prediction device" may include devices used for recognizing a road structure and other vehicles, for example, the camera 10, the radar device 12, and the finder 14.

The second controller 160 performs control of the running driving force output device 200, the brake device 210, and the steering device 220 such that the subject vehicle M passes along a target locus generated by the action plan generator 150 at a scheduled time. For example, the second controller 160 acquires information of a target locus (locus points) generated by the action plan generator 150, stores the acquired information in a memory (not illustrated in the drawing), and controls the running driving force output device 200 or the brake device 210 on the basis of a speed element accompanying the target locus stored in the memory. The second controller 160 controls the steering device 220 in accordance with a bending state of the target locus stored in the memory.

The running driving force output device 200 outputs a running driving force (torque) used for a vehicle to run to driving wheels. The running driving force output device 200, for example, includes a combination of an internal combustion engine, an electric motor, a transmission, and the like and an ECU controlling these components. The ECU controls the components described above in accordance with information input from the second controller 160 or information input from the driving operator 80.

The brake device 210, for example, includes a brake caliper, a cylinder that delivers hydraulic pressure to the brake caliper, an electric motor that generates hydraulic pressure in the cylinder, and a brake ECU. The brake ECU performs control of the electric motor in accordance with information input from the second controller 160 or information input from the driving operator 80 such that a brake torque according to a brake operation is output to each vehicle wheel. The brake device 210 may include a mechanism delivering hydraulic pressure generated in accordance with an operation on the brake pedal included in the driving operators 80 to the cylinder through a master cylinder as a backup. In addition, the brake device 210 is not limited to the configuration described above and may be an electronically-controlled hydraulic brake device that delivers hydraulic pressure in the master cylinder to a cylinder by controlling an actuator in accordance with information input from the second controller 160.

The steering device 220, for example, includes a steering ECU and an electric motor. The electric motor, for example, changes the direction of the steering wheel by applying a force to a rack and pinion mechanism. The steering ECU changes the direction of the steering wheel by driving an electric motor in accordance with information input from the second controller 160 or information input from the driving operator 80.

[Running Locus Prediction—Intersection]

Figure 3:
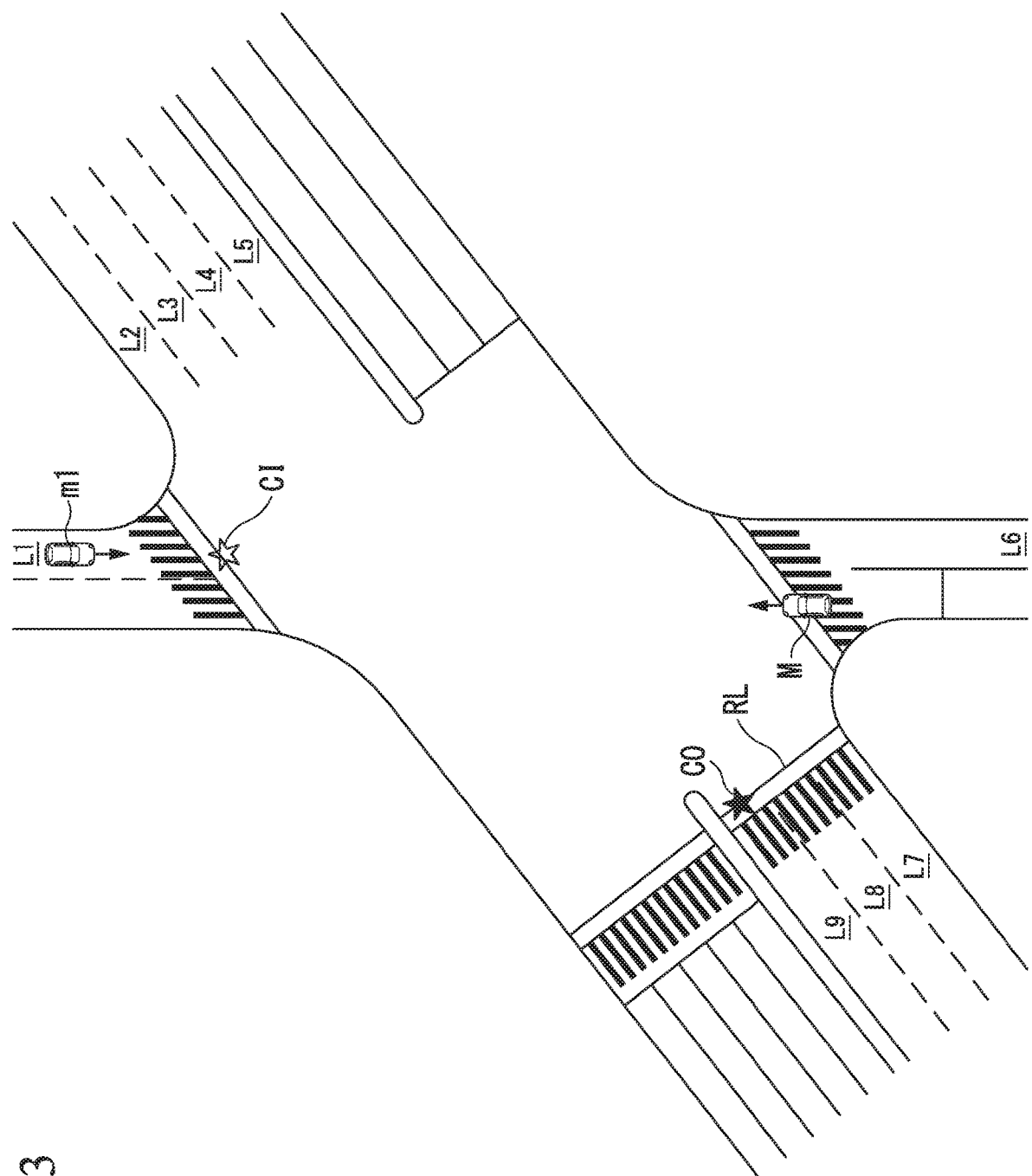
FIG. 3 is a diagram illustrating one example of "a predetermined situation" in which another vehicle m1 that is a prediction target passes through an intersection.

Hereinafter, a prediction of running loci of other vehicles that is executed by cooperation between the recognizer 130 and the running locus predictor 140 will be described. First, a process will be described which is performed in a case in which the predetermined situation is a situation in which another vehicle changes a course at an intersection. FIG. 3 is a diagram illustrating one example of "a predetermined situation" in which another vehicle m1 that is a prediction target passes through an intersection. In FIG. 3, the subject vehicle M is located at a position at which each road connected to an intersection can be looked over, and another vehicle m1 is entering into the intersection from a lane L1. In FIG. 3 and subsequent drawings, a scene on an actual plane seen from the sky is illustrated. In description of FIG. 3 and subsequent drawings, use in a left-traffic country or region is premised. In the description of FIG. 3 and the subsequent drawings, an arrow attached to a vehicle represents an advancement direction of the vehicle.

In such a situation, the road structure recognizer 132 recognizes the position of a place at which another vehicle m1 enters the intersection, in other words, an entrance CI of the intersection. The position of the entrance CI, for example, is defined as an intersection between a center line of a lane L1 and a white line closest to a center part of the intersection (details thereof will be described with reference to FIG. 4). The road structure recognizer 132 recognizes a position of a place at which another vehicle m1 leaves from the intersection, in other words, an exit CO of the intersection. The exit CO is not limited to be narrowed down to one, and there are cases in which a plurality of exits CO are recognized, and the exits are narrowed down to one exit through a process to be described later. In FIG. 3, lanes from which there is a likelihood that another vehicle m1 leaves are lanes L2 to L9. In this case, for example, the position of the exit CO is defined as an intersection between a center line of each lane and a white line closest to the center part of the intersection.

(Case in which Entrance and Exit are Recognized)

Figure 4:
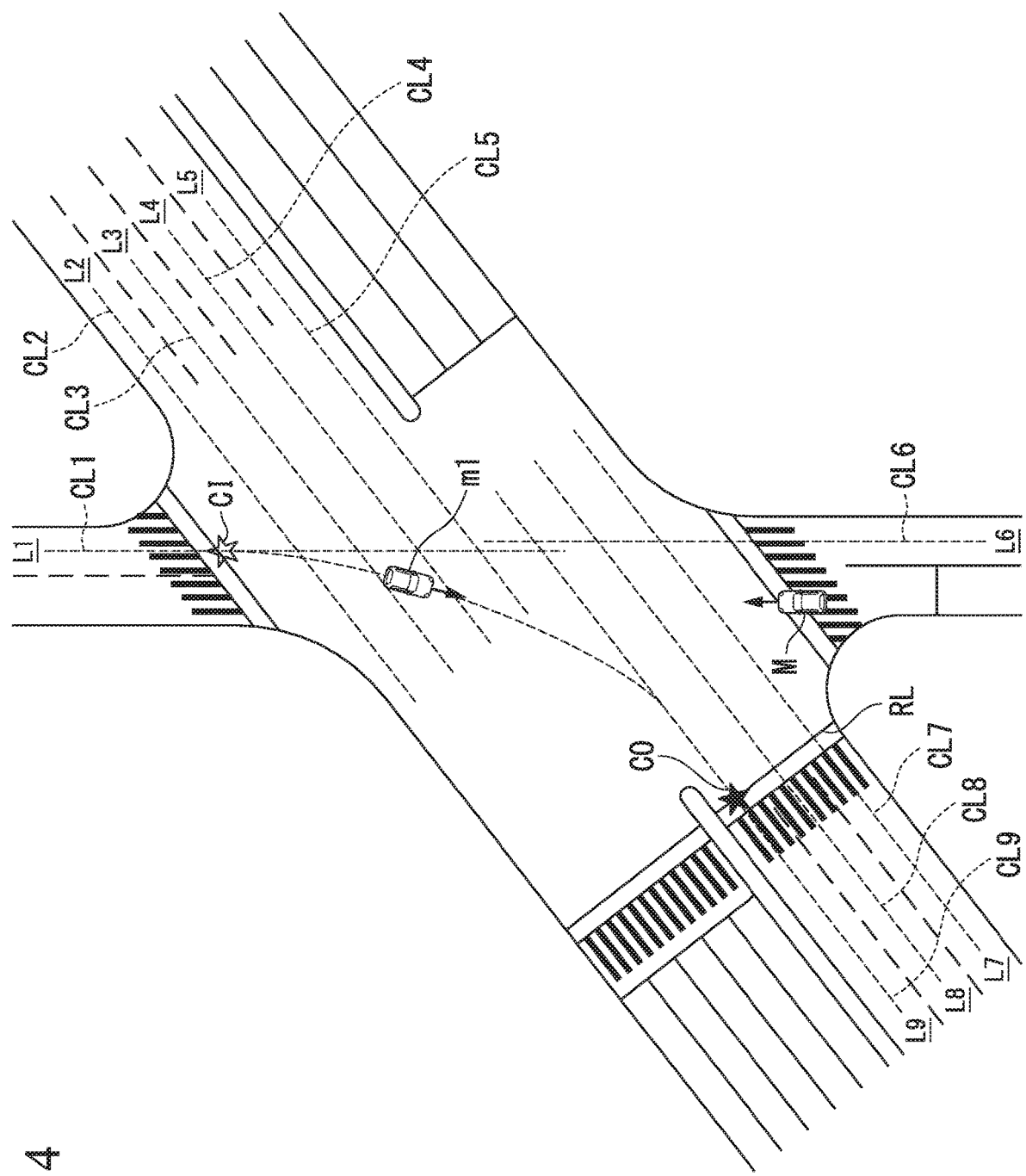
FIG. 4 is a diagram illustrating a process executed by a running locus predictor in a case in which an entrance and an exit of an intersection are recognized.

FIG. 4 is a diagram illustrating a process executed by the running locus predictor 140 in a case in which an entrance CI and an exit CO of an intersection are recognized. The running locus predictor 140, first, virtually sets a center line CL1 of a lane L1 in which another vehicle m1 is running. Similarly, the running locus predictor 140 virtually sets center lines CL2 to CL9 of lanes L2 to L9.

Figure 5:
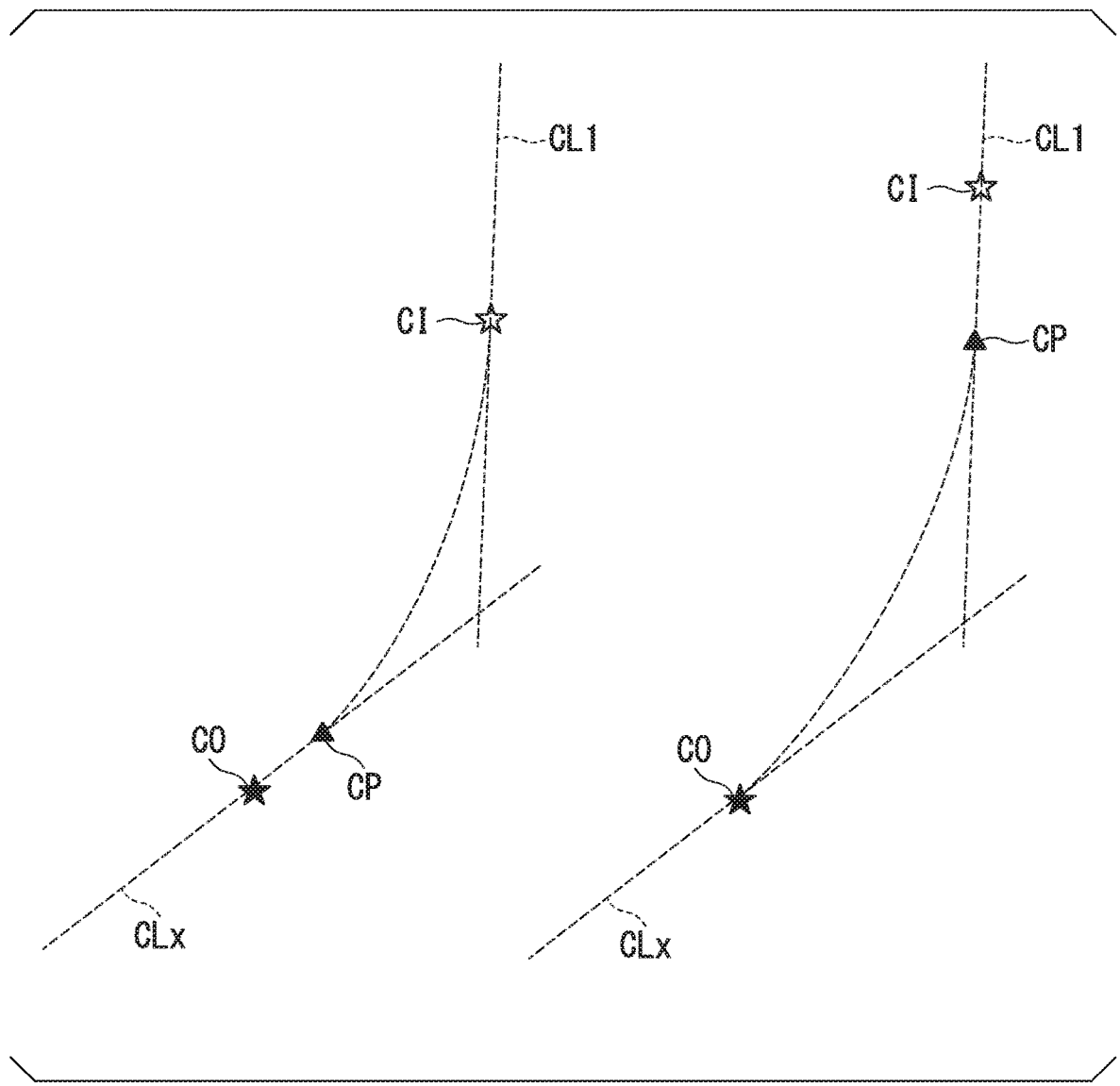
FIG. 5 is a diagram illustrating two patterns of circular arcs that are set.

The running locus predictor 140, for example, extracts a center line intersecting with a center line CL1 from center lines of lanes and sets a circular arc that is inscribed in both a center line CLx of a lane x having the extracted center line and the center line CL1 and passes through one of the entrance and the exit of the intersection. FIG. 5 is a diagram illustrating two patterns of circular arcs that are set. A circular arc passing through the entrance CI of the intersection is set in a left diagram of FIG. 5, and a circular arc passing through the exit CO of the intersection is set in a right diagram of FIG. 5.

The running locus predictor 140 predicts a line in which the center line CL1, the set circular arc described above, and the center line CLx are aligned as a running locus of another vehicle m1. For example, in the case of the left diagram of FIG. 5, a line in which the center line CL1 or the center line CLx is connected to both ends of a circular arc between the entrance CI and a contact point CP as a running locus of another vehicle m1 in the case of advancement to a lane x.

The running locus is acquired for each of lanes from which there is a likelihood that another vehicle m1 leaves. The running locus predictor 140, for example, predicts one running locus in which the positions of another vehicle m1 overlap each other when seen from the sky among a plurality of running loci as a running locus of another vehicle.

(Case in which Entrance Cannot be Recognized)

Figure 6:
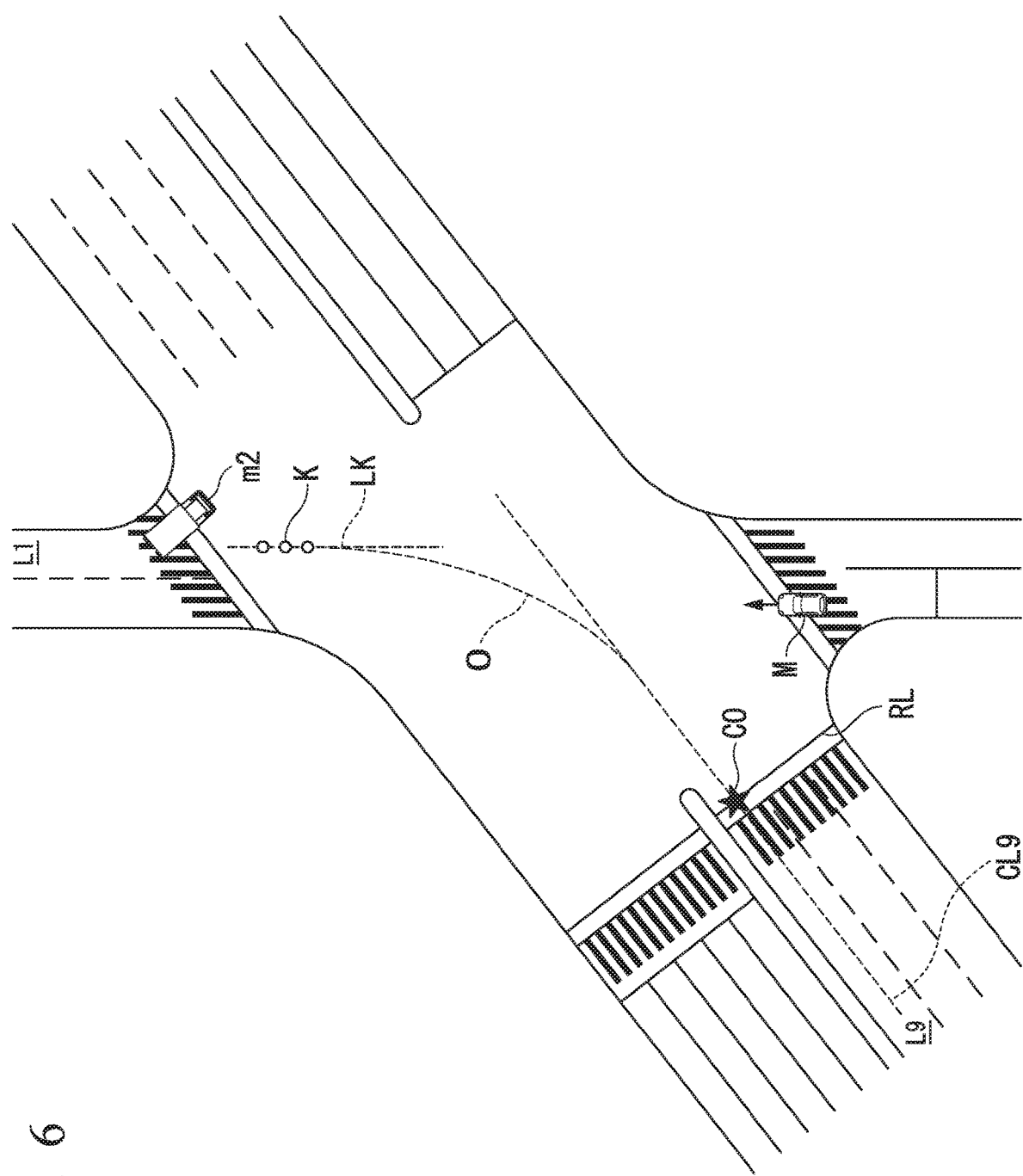
FIG. 6 is a diagram (1) illustrating a process executed by a running locus predictor in a case in which an entrance of an intersection cannot be recognized.

FIG. 6 is a diagram (1) illustrating a process executed by the running locus predictor 140 in a case in which an entrance CI of an intersection cannot be recognized. In the drawing, the entrance CI of the intersection is blocked by another vehicle m2 and becomes a blind area for the camera 10 and the like of the subject vehicle M and thus, cannot be recognized by the subject vehicle M. In this case, the running locus predictor 140 estimates a running locus of another vehicle m1 in the future on the basis of the running locus of another vehicle m1 in the past. For example, the running locus predictor 140 predicts a running locus in the future by applying a Kalman filter to a running locus of another vehicle m1 in the past that has been sampled for every predetermined time. In the drawing, K represents sampling points of a running locus in the past and in the future.

The principle of the Kalman filter will be briefly described. In a case in which a Kalman filter process is executed, the running locus predictor 140, first, applies moving of another vehicle m1 to each of a plurality of models. As the models, for example, (1) running straight while maintaining the speed, (2) running straight while accelerating or decelerating, (3) turning while maintaining the speed, (4) turning while accelerating or decelerating, and the like are prepared in advance.

The running locus predictor 140 selects a most applicable model. A Kalman gain is realized by alternately performing a prediction step represented in Equations (1) and (2) and an update step represented in Equations (3) to (5). In each equation, k represents a process cycle. $\mu_k$ (tilde) represents an in-advance estimated value in Equation (1), and $\Sigma_k$ (tilde) represents an in-advance error covariance in Equation (2). In addition, $G_k$ is a matrix configuring a state space representation (operation model), and R is $\Sigma\mu$.

$$\tilde{\mu}_k g(\mu_{k-1}) \quad (1)$$

$$\tilde{\Sigma}_k G_k \Sigma_{k-1} G_k^T + R \quad (2)$$

In Equation (3), $K_k$ represents a Kalman gain, C represents a matrix configuring a state space representation (observation model), and Q represents $\Sigma_z$ (here, z is a left term of the observation model). $\mu_k$ represents a post estimated value in Equation (4), and $\Sigma_k$ represents a post error covariance in Equation (5). $\mu_k$ represented in Equation (4) is handled as $\mu_{k+1}$ (tilde) at the (k+1)-th cycle, and $\Sigma_k$ represented in Equation (5) is handled as $\Sigma_{k+1}$ at the (k+1)-th cycle.

$$K_k \tilde{\Sigma}_k C^T (C \tilde{\Sigma}_k C^T + Q)^{-1} \quad (3)$$

$$\mu_k = \tilde{\mu}_k + K_k(z_k - C\tilde{\mu}_k) \quad (4)$$

$$\Sigma_k = (I - K_k C)\tilde{\Sigma}_k \quad (5)$$

In a case in which the running locus matches one of model (1) running straight while maintaining the speed and (2) running straight while decelerating/accelerating, the running locus predictor 140, as illustrated in FIG. 6, sets a straight line LK regarded as a running locus. In this case, in a case in which another vehicle m1 is predicted to make a left or right turn (not running straight) in accordance with an operation state of a direction indicator or deceleration of another vehicle m1 or left/right turn information acquired by communicating with another vehicle m1, the running locus predictor 140, for example, sets a circular arc that is inscribed in both the center line CLx of a focused lane x and the straight line LK and passes through one of the current position of another vehicle m1 and the exit CO. Then, the running locus predictor 140 predicts a line in which the straight line LK, the set circular arc described above, and the center line CLx are aligned as a running locus of another vehicle m1. In this way, the running locus (provisional running locus) predicted from the running locus of another vehicle m1 in the past using the Kalman filter is corrected on the basis of the position of the exit CO, and a running locus of another vehicle m1 in the future is predicted. While there are cases in which running loci are not narrowed down to one through a relating process, the running locus predictor 140, for example, may switch the model to (3) turning while maintaining the speed or (4) turning while accelerating or decelerating at a time point at which another vehicle m1 starts to turn and execute the following process described with reference to FIG. 7.

Figure 7:
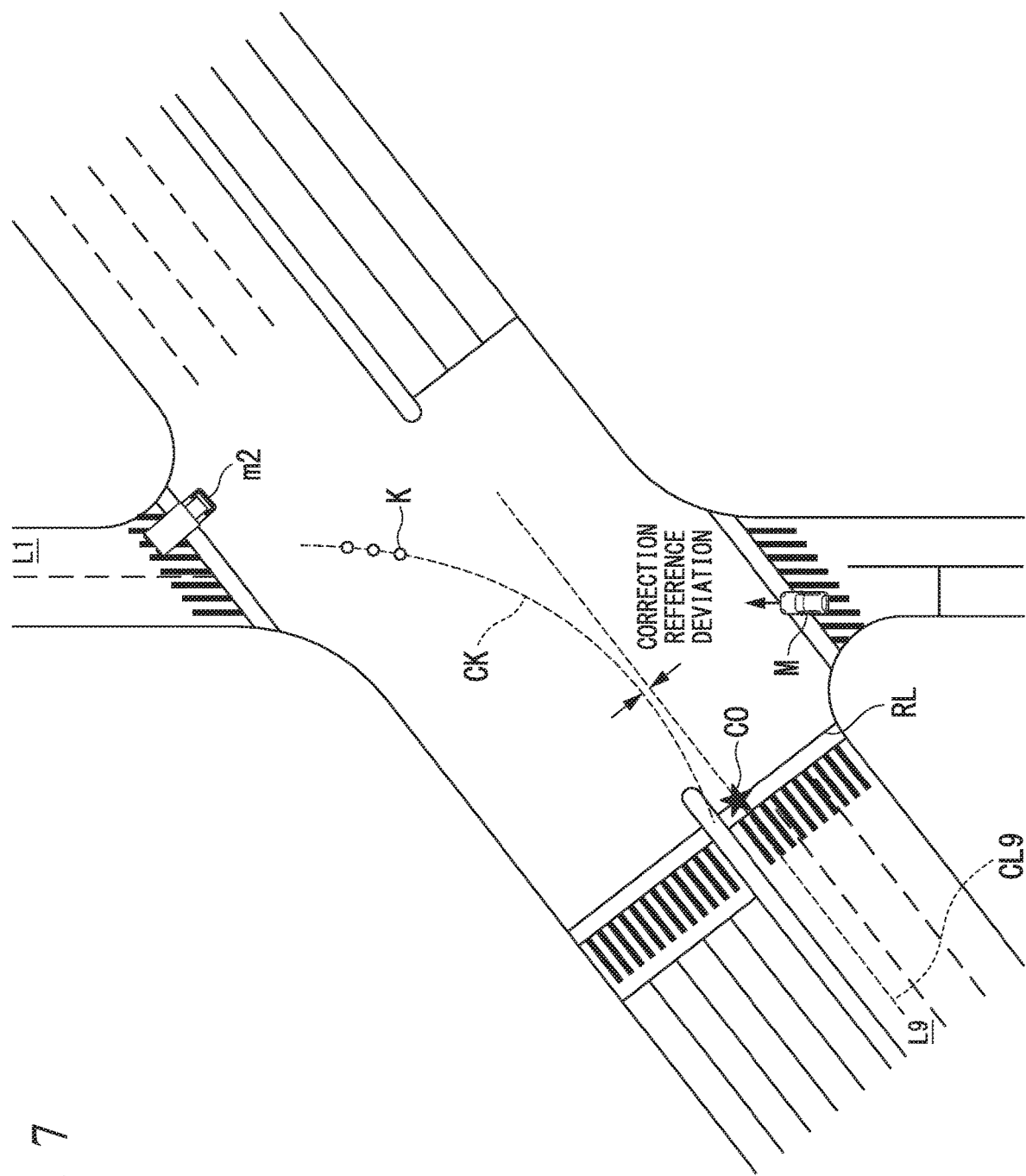
FIG. 7 is a diagram (2) illustrating a process executed by the running locus predictor in a case in which an entrance of an intersection cannot be recognized.

In a case in which the running locus matches one of the models (3) turning while maintaining the speed and (4) turning while accelerating or decelerating, the running locus predictor 140, for example, as illustrated in FIG. 7, may set a straight line CK acquired by extending the model to the exit CO of the intersection, select a lane having a smallest correction reference deviation illustrated in the drawing, and correct the model of the Kalman filter such that the correction reference deviation is negated. FIG. 7 is a diagram (2) illustrating a process executed by the running locus predictor 140 in a case in which an entrance CI of an intersection cannot be recognized.

(Case in which Exit Cannot be Recognized)

Figure 8:
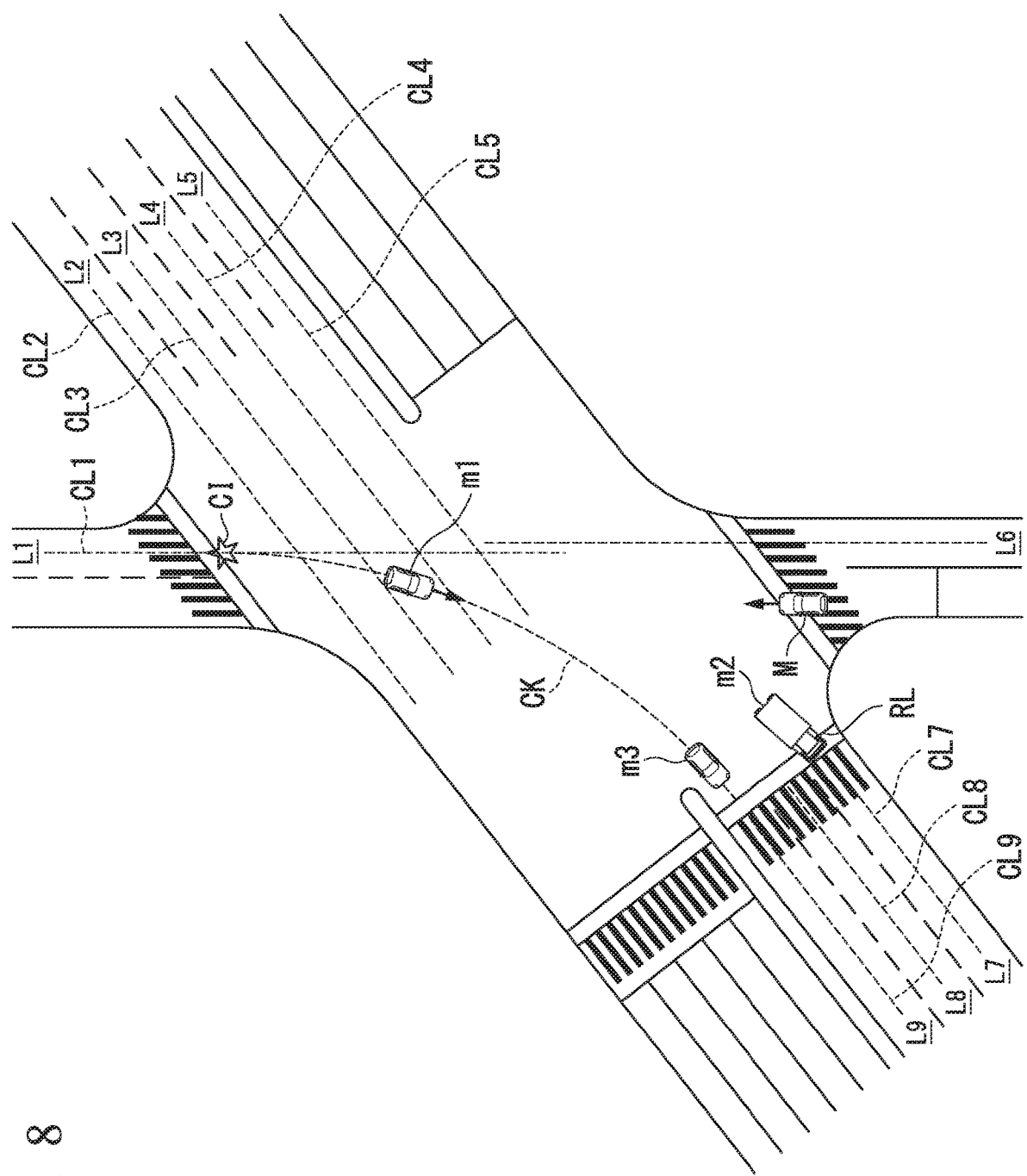
FIG. 8 is a diagram (1) illustrating a process executed by the running locus predictor in a case in which an exit of an intersection cannot be recognized.

FIG. 8 is a diagram (1) illustrating a process executed by the running locus predictor 140 in a case in which an exit CO of an intersection cannot be recognized. In the drawing, exits leaving from the intersection toward lanes L7 and L9 are blocked by other vehicles m2 and m3 running in front of another vehicle m1 and cannot be recognized from a subject vehicle M. In this case, the running locus predictor 140, for example, estimates that there is an exit CO toward the lane L7 at an advancement destination of another vehicle m2 and estimates that there is an exit CO toward the lane L9 at an advancement destination of another vehicle m3. An advancement destination, for example, is defined as an intersection between a running locus of another vehicle and a white line RL closest to the center part of the intersection. The running locus predictor 140 performs a process similar to that of (Case in which entrance and exit are recognized) or (Case in which entrance cannot be recognized) described above on the basis of the position of the estimated exit CO.

Figure 9:
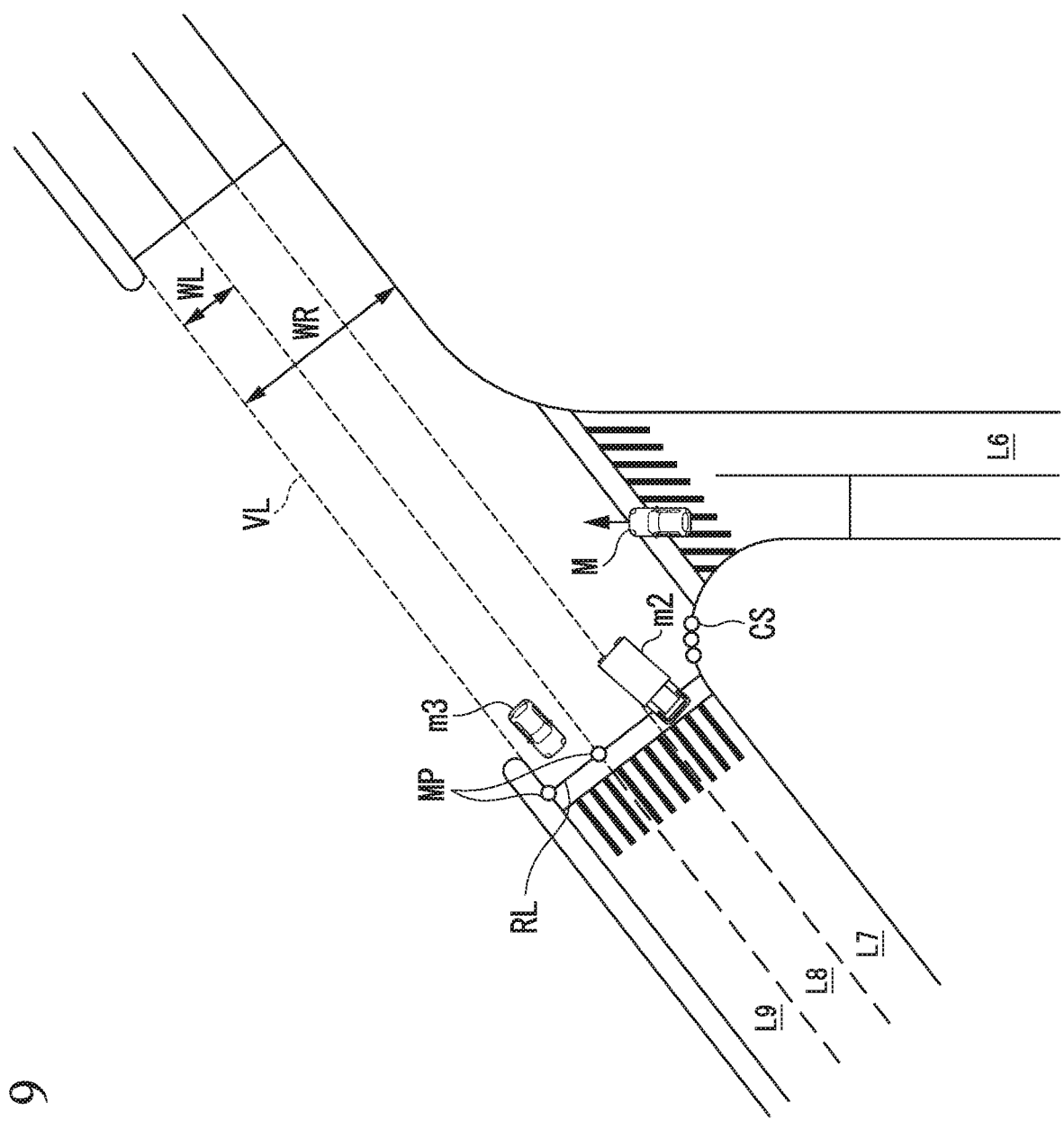
FIG. 9 is a diagram (2) illustrating a process executed by the running locus predictor in a case in which an exit of an intersection cannot be recognized.

FIG. 9 is a diagram (2) illustrating a process executed by the running locus predictor 140 in a case in which an exit CO of an intersection cannot be recognized. In this drawing, a part of the intersection illustrated in FIG. 3 and the like is illustrated in an enlarged scale. The running locus predictor 140, for example, sets virtual lines VL by virtually extending road partition lines by referring to a road structure of a position facing lanes L7 to L9 leaving from the intersection. Then, the running locus predictor 140 sets a middle point between two intersections MP between the virtual lines VL and an exit-side white line RL as the exit CO of the intersection.

The running locus predictor 140 may estimate the position of the exit CO of the intersection on the basis of structures, for example, a curbstone CS, a mark, a traffic light, a guardrail, and the like in a range seen from the subject vehicle M. In such a case, the running locus predictor 140 may estimate the position of the exit CO of the intersection more accurately on the basis of a road width WR and/or a lane width WL recognized from the road structure of the position facing the lanes L7 to L9 leaving from the intersection.

[Process Flow]

Figure 10:
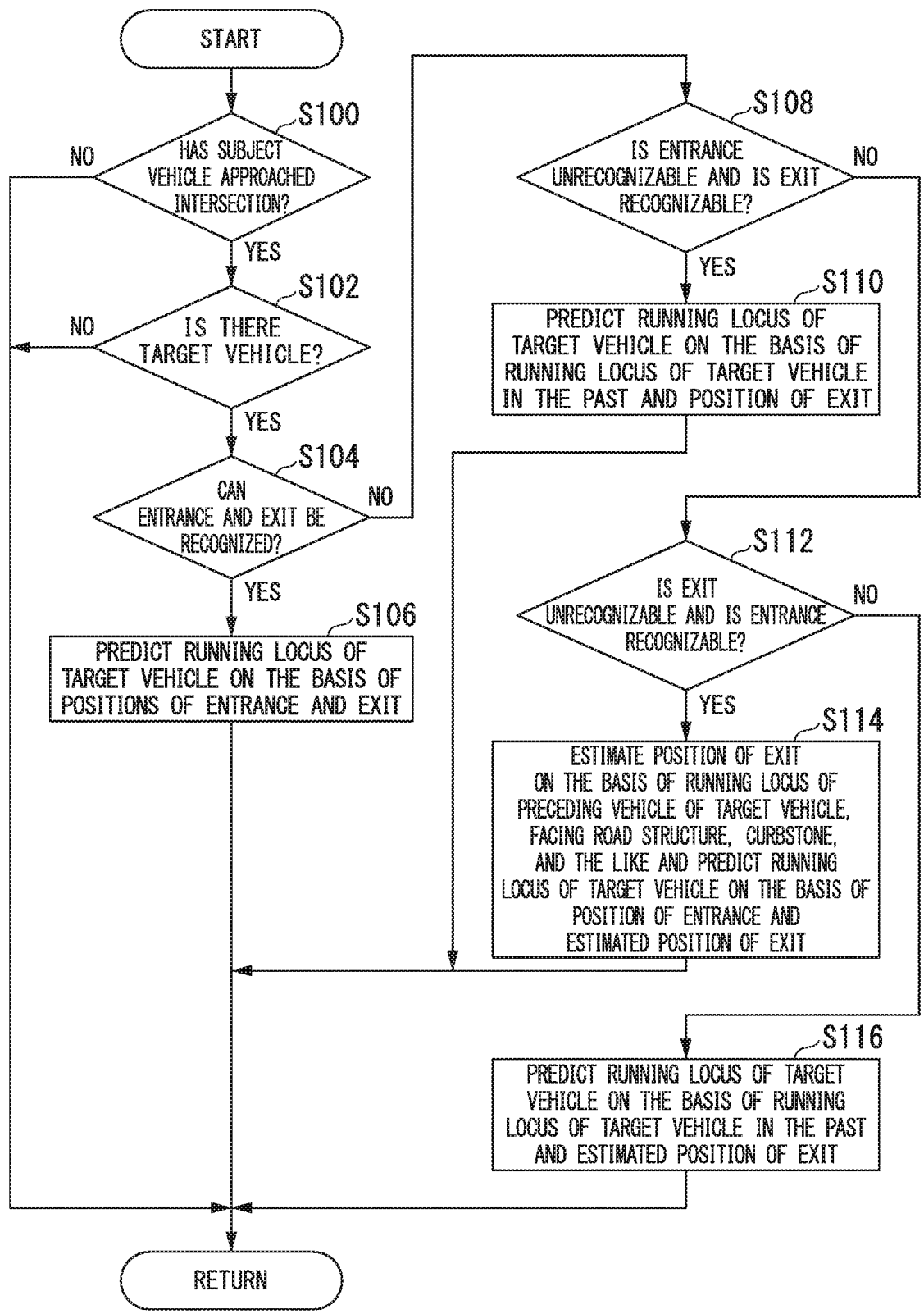
FIG. 10 is a flowchart illustrating one example of the flow of a process executed by the running locus predictor.

FIG. 10 is a flowchart illustrating one example of the flow of a process executed by the running locus predictor 140. The process of this flowchart, for example, is repeatedly executed.

First, the running locus predictor 140 determines whether or not the subject vehicle M has approached the intersection (Step S100). Here, "approaching", for example, means that the subject vehicle becomes less than a predetermined distance or a predetermined time to the entrance CI or the center point of the intersection. In a case in which the subject vehicle M has not approached the intersection, one routine of this flowchart ends.

On the other hand, in a case in which the subject vehicle M has approached the intersection, the running locus predictor 140 determines whether or not there is another vehicle (hereinafter target vehicle) of which a running locus to be predicted by referring to a result of recognition acquired by the other-vehicle recognizer 134 (Step S102). A target vehicle, for example, is a vehicle acquired by excluding other vehicles advancing along running loci not clearly intersecting with the subject vehicle M among other vehicles present within the intersection or approaching the intersection. In a case in which there is no target vehicle, one routing of this flowchart ends.

On the other hand, in a case in which there is a target vehicle, the running locus predictor 140 determines whether or not the road structure recognizer 132 can recognize (or can recognized within a predetermined time; hereinafter, the same) both an entrance and an exit of the intersection (Step S104). In a case in which the road structure recognizer 132 can recognize both an entrance and an exit of the intersection, the running locus predictor 140 predicts a running locus of the target vehicle on the basis of the position of the entrance and the position of the exit of the intersection (further on the basis of the position of the target vehicle in the example described above) (Step S106).

On the other hand, in a case in which the road structure recognizer 132 cannot recognize both an entrance and an exit of the intersection, the running locus predictor 140 determines whether or not the road structure recognizer 132 cannot recognize the entrance of the intersection and can recognize the exit (Step S108). In a case in which the road structure recognizer 132 cannot recognize the entrance of the intersection and can recognize the exit, the running locus predictor 140 predicts a running locus of the target vehicle on the basis of a running history of the target vehicle in the past and the position of the exit of the intersection (Step S110).

In a case in which No is determined in Step S108, the running locus predictor 140 determines whether or not the road structure recognizer 132 cannot recognize the exit of the intersection and can recognize the entrance (Step S112). In a case in which the road structure recognizer 132 cannot recognize the exit of the intersection and can recognize the entrance, the running locus predictor 140 estimates the position of the exit of the intersection on the basis of a running locus of a preceding vehicle of the target vehicle, a facing road structure, a curbstone, and the like and predicts a running locus of the target vehicle on the basis of the position of the entrance of the intersection and the estimated position of the exit (Step S114).

On the other hand, in a case in which No is determined in Step S112 (in a case in which neither an entrance nor an exit of the intersection cannot be recognized), the running locus predictor 140 predicts a running locus of the target vehicle on the basis of the running history of the target vehicle in the past and the position of the exit of the intersection estimated similar to Step S114 (Step S116).

In accordance a relating process, even in a case in which at least a part of the intersection cannot be recognized by the road structure recognizer 132, a running locus of the target vehicle can be appropriately predicted.

[Running Locus Prediction—Road Crossing]

Figure 11:
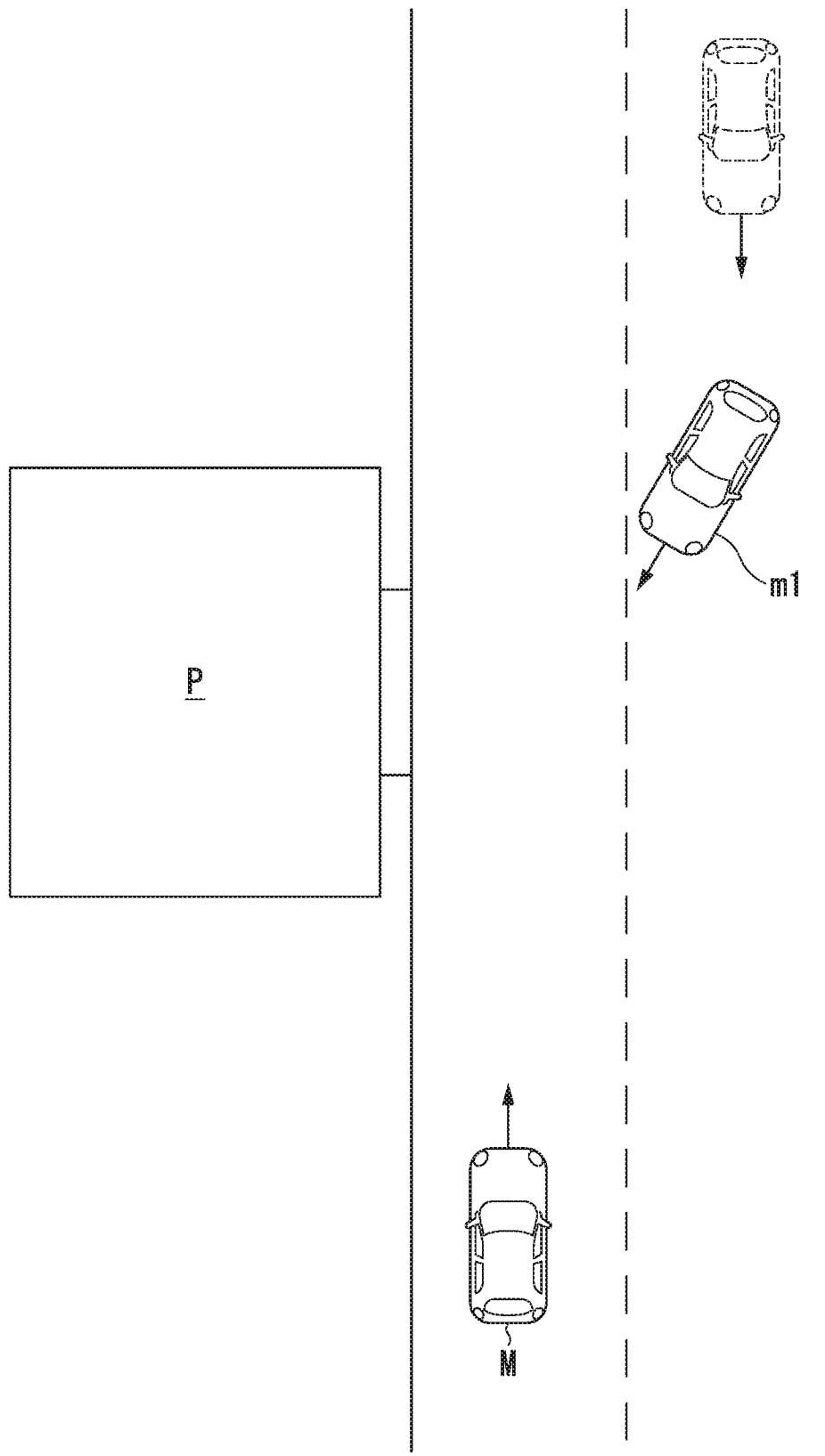
FIG. 11 is a diagram illustrating one example of a "predetermined situation" in which another vehicle that is an oncoming vehicle passes through an intersection.

Hereinafter, a process performed in a case in which a predetermined situation is a situation in which another vehicle that is an oncoming vehicle is crossing a road will be described. FIG. 11 is a diagram illustrating one example of a "predetermined situation" in which another vehicle m1 that is an oncoming vehicle passes through an intersection. In this situation, another vehicle m1 that is an oncoming vehicle for the subject vehicle M is trying to cross a road and advances to a parking space P disposed outside the road.

Figure 12:
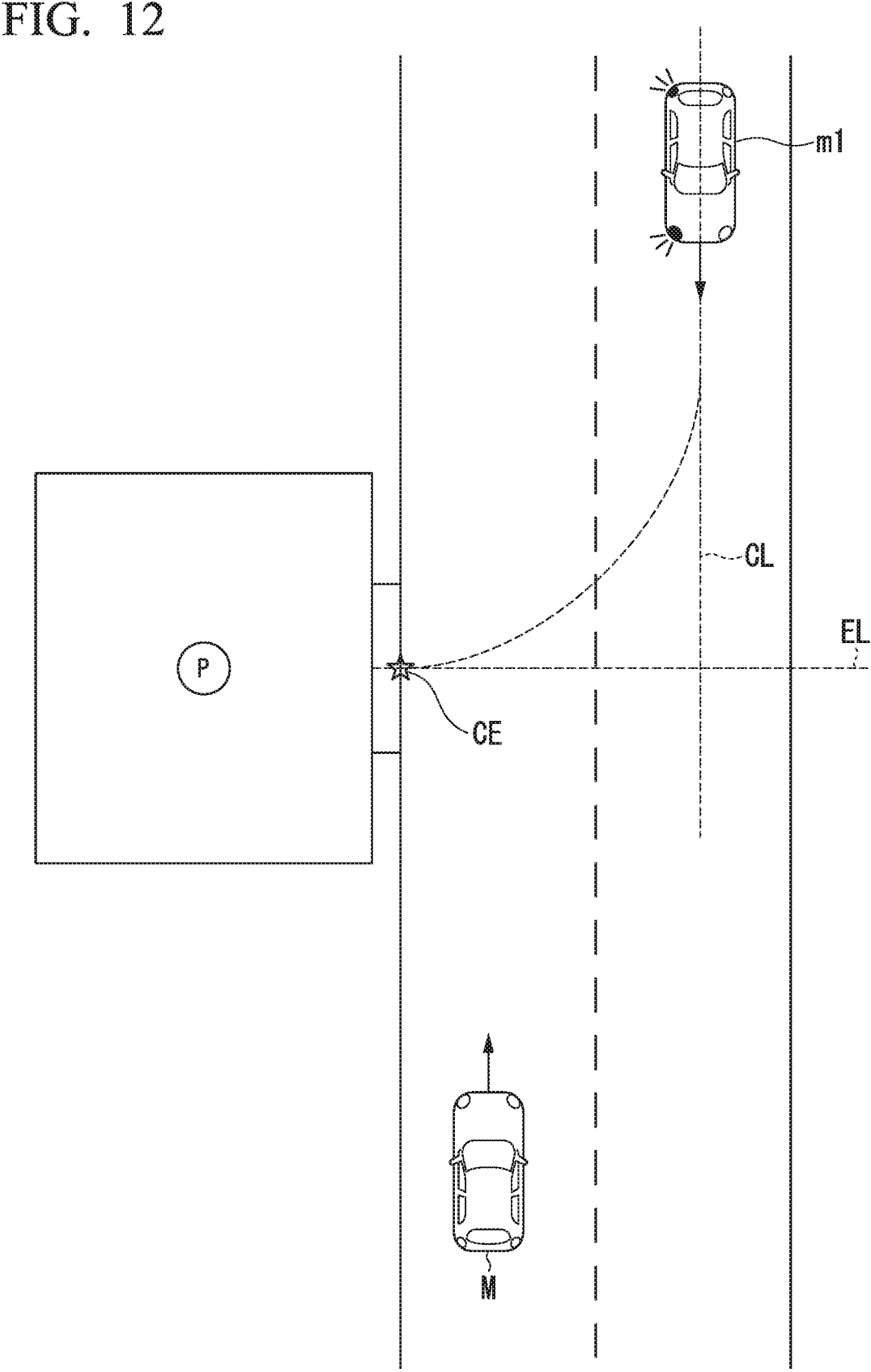
FIG. 12 is a diagram illustrating a process executed by the running locus predictor.

FIG. 12 is a diagram illustrating a process executed by the running locus predictor 140. In this case, the running locus predictor 140, for example, sets a center line CL of a lane in which another vehicle m1 is running and a virtual line EL acquired by extending from a center part CE of the entrance/exit of the parking space P in a road width direction and sets a circular arc that is inscribed in both the center line CL and the virtual line EL and passes through one of the current position of the other vehicle m1 and the center part CE. Then, the running locus predictor 140 predicts a line in which the center line CL, the circular arc set as above, and the virtual line EL are aligned as a running locus of another vehicle m1.

Figure 13:
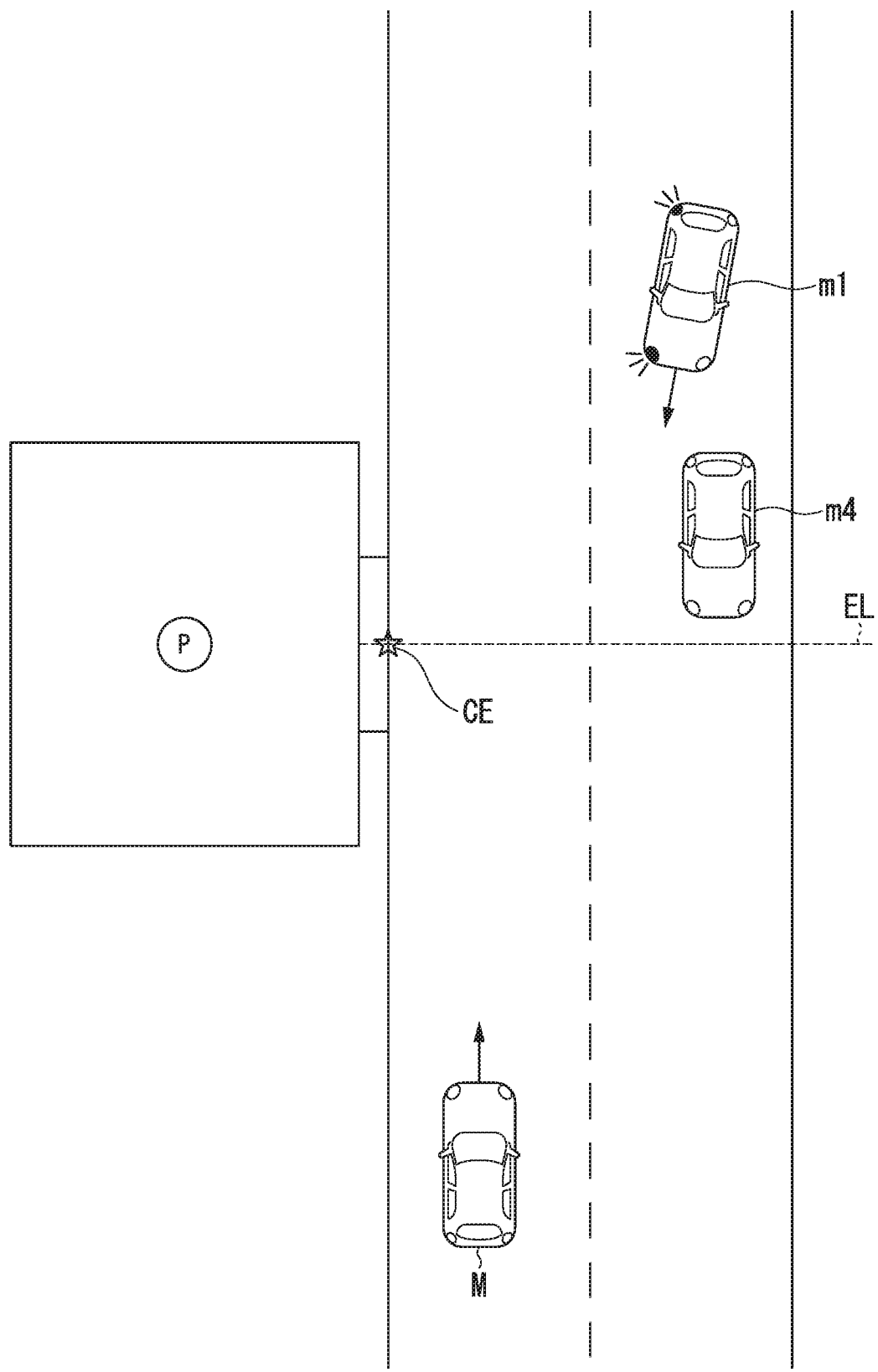
FIG. 13 is a diagram illustrating a process executed by the running locus predictor in a case in which at least a part of an opposing lane cannot be recognized.

FIG. 13 is a diagram illustrating a process executed by the running locus predictor 140 in a case in which at least a part of an opposing lane cannot be recognized. In the example illustrated in the drawing, in accordance with the presence of another vehicle m4, a part of a lane in which another vehicle m1 is running is blocked, and the center line CL illustrated in FIG. 12 cannot be correctly recognized. In this case, similar to the case of the intersection (a case in which an entrance cannot be recognized), the running locus predictor 140 estimates a running locus of another vehicle m1 in the future on the basis of the running locus of another vehicle m1 in the past. For example, the running locus predictor 140 predicts a running locus of another vehicle m1 in the future by applying a Kalman filter to the running locus of another vehicle m1 in the past, which has been sampled for every predetermined time, and corrects the running locus of another vehicle m1 in the future using the position of the center part CE of the entrance/exit of the parking space P.

According to the prediction device, the prediction method, and the storage medium according to the embodiment described above, the recognizer 130 that recognizes a road structure and other vehicles in the vicinity of a subject vehicle and the running locus predictor 140 that predicts a running locus of another vehicle in the future, which has been recognized by the recognizer 130, on the basis of the road structure recognized by the recognizer 130 in a predetermined situation are included, and, in a predetermined situation, in a case in which at least a part of the road structure used for predicting the running locus of another vehicle in the future cannot be recognized by the recognizer 130, the running locus predictor 140 predicts a running locus of another vehicle in the future on the basis of the running locus of another vehicle in the past acquired on the basis of a result of recognition in the past acquired by the recognizer 130, whereby the running locus of another vehicle in the future can be predicted more continuously.

[Hardware Configuration]

Figure 14:
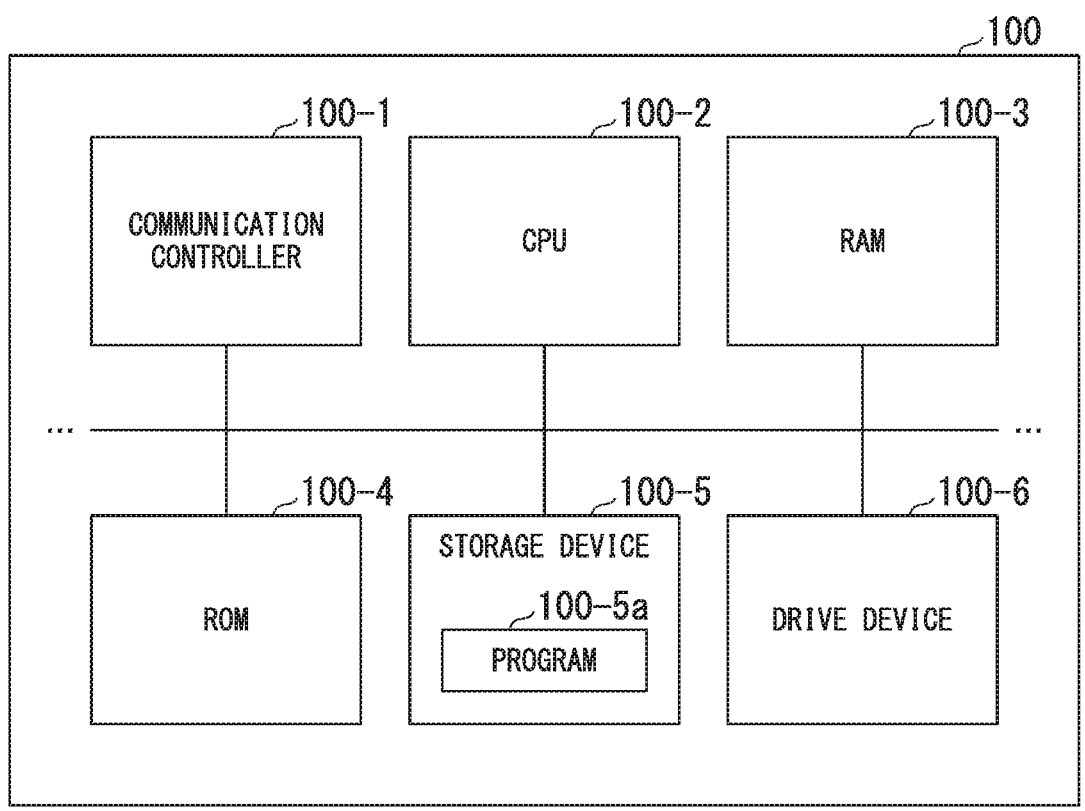
FIG. 14 is a diagram illustrating one example of the hardware configuration of an automatic driving control device according to an embodiment.

FIG. 14 is a diagram illustrating one example of the hardware configuration of an automatic driving control device 100 according to an embodiment. As illustrated in the drawing, the automatic driving control device 100 has a configuration in which a communication controller 100-1, a CPU 100-2, a random access memory (RAM) 100-3 used as a working memory, a read only memory (ROM) 100-4 storing a boot program and the like, a storage device 100-5 such as a flash memory or a hard disk drive (HDD), a drive device 100-6, and the like are interconnected through an internal bus or a dedicated communication line. The communication controller 100-1 communicates with constituent elements other than the automatic driving control device 100. A program 100-5a executed by the CPU 100-2 is stored in the storage device 100-5. This program is expanded into the RAM 100-3 by a direct memory access (DMA) controller (not illustrated in the drawing) or the like and is executed by the CPU 100-2. In this way, some or all of the recognizer 130, the running locus predictor 140, and the action plan generator 150 are realized.

The embodiment described above can be presented as below.

A prediction device including a storage device storing a program and a hardware processor and configured such that the hardware processor, by executing the program stored in the storage device, recognizes a road structure and another vehicle in the vicinity of a subject vehicle, predicts a running locus of the other vehicle recognized by the recognizer in the future on the basis of the road structure recognized by the recognizer in a predetermined situation and, in the predetermined situation, in a case in which at least a part of the road structure used for predicting the running locus of the other vehicle in the future is not recognizable for the recognizer, predicts the running locus of the other vehicle in the future on the basis of a running locus of the other vehicle in the past acquired on the basis of a result of recognition in the past that is acquired by the recognizer.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A vehicle control device comprising a processor that executes instructions to:
    recognize a road structure and another vehicle in the vicinity of a subject vehicle using at least one of a camera, a radar device, and a finder, wherein the road structure is determined by identifying a road partition line, a curbstone, a median strip, and a guardrail;
    predict a running locus of the another vehicle in the future based on a point of start turning recognized based on the road structure, at least one point of finish turning predicted based on the road structure and a position of the another vehicle in a predetermined situation; and
    perform automatic driving control by generating a target locus along which the subject vehicle runs in the future such that the target locus does not interfere with the predicted running locus of the another vehicle,
    wherein, in the predetermined situation, in a case in which at least a part of the road structure used for predicting the running locus of the another vehicle in the future is not recognized, the processor further executes instructions to predict the running locus of the another vehicle in the future based on a running locus of the another vehicle in the past acquired based on a result of recognition in the past,
    wherein the predetermined situation is a situation in which the another vehicle changes a course at an intersection,
    wherein the processor further executes instructions to predict the running locus of the another vehicle in the future based on a position of an entrance of the intersection and at least one exit of the intersection through which the another vehicle passes, which are acquired from the recognized road structure, and predict the running locus of the another vehicle in the future based on the running locus of the another vehicle in the past in a case in which one or both of the positions of the entrance and the at least one exit are blocked, wherein, the point of start turning includes the entrance of the intersection and the at least one point of finish turning includes the at least one exit of the intersection, and wherein the processor further executes instructions to predict the running locus of the another vehicle in the future by correcting a provisional running locus predicted from the running locus of the another vehicle in the past based on the position of the at least one exit in a case in which the position of the at least one exit is recognized, and the position of the entrance is not recognized.

2. The vehicle control device according to claim 1, wherein the predetermined situation is a situation in which the another vehicle crosses a road and advances out of the road in a case in which the another vehicle is an oncoming vehicle.

3. A vehicle control device comprising a processor that executes instructions to:

recognize a road structure and another vehicle in the vicinity of a subject vehicle using at least one of a camera, a radar device, and a finder, wherein the road structure is determined by identifying a road partition line, a curbstone, a median strip, and a guardrail;

predict a running locus of the another vehicle in the future based on a point of start turning recognized based on the road structure, at least one point of finish turning predicted based on the road structure and a position of the another vehicle in a predetermined situation; and perform automatic driving control by generating a target locus along which the subject vehicle runs in the future such that the target locus does not interfere with the predicted running locus of the another vehicle, wherein, in the predetermined situation, in a case in which at least a part of the road structure used for predicting the running locus of the another vehicle in the future is not recognized, the processor further executes instructions to predict the running locus of the another vehicle in the future based on a running locus of the another vehicle in the past acquired based on a result of recognition in the past, wherein the predetermined situation is a situation in which the another vehicle changes a course at an intersection, wherein the processor further executes instructions to predict the running locus of the another vehicle in the future based on a position of an entrance of the intersection and at least one exit of the intersection through which the another vehicle passes, which are acquired from the recognized road structure, and predict the running locus of the another vehicle in the future based on the running locus of the another vehicle in the past in a case in which one or both of the positions of the entrance and the at least one exit are blocked, wherein, the point of start turning includes the entrance of the intersection and the at least one point of finish turning includes the at least one exit of the intersection, and wherein, in a case in which the position of the exit is not recognized, the processor further executes instructions to estimate the position of the at least one exit based on a running locus of a preceding vehicle in the past running in front of the another vehicle that is a target for predicting the running locus in the future and predict the running locus of the another vehicle in the future.

4. A vehicle control device comprising a processor that executes instructions to:

recognize a road structure and another vehicle in the vicinity of a subject vehicle using at least one of a camera, a radar device, and a finder, wherein the road structure is determined by identifying a road partition line, a curbstone, a median strip, and a guardrail;

predict a running locus of the another vehicle in the future based on a point of start turning recognized based on the road structure, at least one point of finish turning predicted based on the road structure and a position of the another vehicle in a predetermined situation; and perform automatic driving control by generating a target locus along which the subject vehicle runs in the future such that the target locus does not interfere with the predicted running locus of the another vehicle, wherein, in the predetermined situation, in a case in which at least a part of the road structure used for predicting the running locus of the another vehicle in the future is not recognized, the processor further executes instructions to predict the running locus of the another vehicle in the future based on a running locus of the another vehicle in the past acquired based on a result of recognition in the past, wherein the predetermined situation is a situation in which the another vehicle changes a course at an intersection, wherein the processor further executes instructions to predict the running locus of the another vehicle in the future based on a position of an entrance of the intersection and at least one exit of the intersection through which the another vehicle passes, which are acquired from the recognized road structure, and predict the running locus of the another vehicle in the future based on the running locus of the another vehicle in the past in a case in which one or both of the positions of the entrance and the at least one exit are blocked, wherein, the point of start turning includes the entrance of the intersection and the at least one point of finish turning includes the at least one exit of the intersection, and wherein, in a case in which the position of the exit is not recognized, the processor further executes instructions to estimate the position of the at least one exit based on the road structure on a side facing the at least one exit at the intersection and predict the running locus of the another vehicle in the future based on the estimated position of the at least one exit.

5. A vehicle control device comprising a processor that executes instructions to:

recognize a road structure and another vehicle in the vicinity of a subject vehicle using at least one of a camera, a radar device, and a finder, wherein the road structure is determined by identifying a road partition line, a curbstone, a median strip, and a guardrail;

predict a running locus of the another vehicle in the future based on a point of start turning recognized based on the road structure, at least one point of finish turning predicted based on the road structure and a position of the another vehicle in a predetermined situation; and perform automatic driving control by generating a target locus along which the subject vehicle runs in the future such that the target locus does not interfere with the predicted running locus of the another vehicle, wherein, in the predetermined situation, in a case in which at least a part of the road structure used for predicting the running locus of the another vehicle in the future is not recognized, the processor further executes instructions to predict the running locus of the another vehicle in the future based on a running locus of the another vehicle in the past acquired based on a result of recognition in the past, wherein the predetermined situation is a situation in which the another vehicle changes a course at an intersection, wherein the processor further executes instructions to predict the running locus of the another vehicle in the future based on a position of an entrance of the intersection and at least one exit of the intersection through which the another vehicle passes, which are acquired from the recognized road structure, and predict the running locus of the another vehicle in the future based on the running locus of the another vehicle in the past in a case in which one or both of the positions of the entrance and the at least one exit are blocked, wherein, the point of start turning includes the entrance of the intersection and the at least one point of finish turning includes the at least one exit of the intersection, and wherein, in a case in which the position of the at least one exit is not recognized, the processor further executes instructions to estimate the position of the at least one exit based on a road width on a side facing the at least one exit at the intersection and predict the running locus of the another vehicle in the future based on the estimated position of the at least one exit.

6. A vehicle control device comprising a processor that executes instructions to:

recognize a road structure and another vehicle in the vicinity of a subject vehicle using at least one of a camera, a radar device, and a finder, wherein the road structure is determined by identifying a road partition line, a curbstone, a median strip, and a guardrail;

predict a running locus of the another vehicle in the future based on a point of start turning recognized based on the road structure, at least one point of finish turning predicted based on the road structure and a position of the another vehicle in a predetermined situation; and perform automatic driving control by generating a target locus along which the subject vehicle runs in the future such that the target locus does not interfere with the predicted running locus of the another vehicle, wherein, in the predetermined situation, in a case in which at least a part of the road structure used for predicting the running locus of the another vehicle in the future is not recognized, the processor further executes instructions to predict the running locus of the another vehicle in the future based on a running locus of the another vehicle in the past acquired based on a result of recognition in the past, wherein the predetermined situation is a situation in which the another vehicle changes a course at an intersection, wherein the processor further executes instructions to predict the running locus of the another vehicle in the future based on a position of an entrance of the intersection and at least one exit of the intersection through which the another vehicle passes, which are acquired from the recognized road structure, and predict the running locus of the another vehicle in the future based on the running locus of the another vehicle in the past in a case in which one or both of the positions of the entrance and the at least one exit are blocked, wherein, the point of start turning includes the entrance of the intersection and the at least one point of finish turning includes the at least one exit of the intersection, and wherein, in a case in which the position of the at least one exit is not recognized, the processor further executes instructions to estimate the position of the at least one exit based on a position of a structure part disposed near the at least one exit and predict the running locus of the another vehicle in the future based on the estimated position of the at least one exit.

\* \* \* \* \*